US008372280B2

(12) United States Patent
Kluson-Heβlinger et al.

(10) Patent No.: US 8,372,280 B2
(45) Date of Patent: Feb. 12, 2013

(54) FUEL FILTER OF AN INTERNAL COMBUSTION ENGINE

(75) Inventors: Heike Kluson-Heβlinger, Freiberg (DE); Gunther Kraft, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 756 days.

(21) Appl. No.: 12/535,835

(22) Filed: Aug. 5, 2009

(65) Prior Publication Data

US 2010/0032356 A1 Feb. 11, 2010

(30) Foreign Application Priority Data

Aug. 7, 2008 (DE) ........................ 20 2008 010 505

(51) Int. Cl.
*B01D 35/30* (2006.01)
*B01D 35/31* (2006.01)
*B01D 27/08* (2006.01)

(52) U.S. Cl. ........................ 210/232; 210/443; 210/450

(58) Field of Classification Search .................. 210/232, 210/443, 450

See application file for complete search history.

(56) References Cited

U.S. PATENT DOCUMENTS

| | | | | |
|---|---|---|---|---|
| 1,471,807 | A * | 10/1923 | Roosevelt | 210/304 |
| 2,023,423 | A * | 12/1935 | Kleckner | 210/452 |
| 2,156,329 | A * | 5/1939 | Beck | 210/306 |
| 2,424,932 | A * | 7/1947 | Juhasz | 210/407 |
| 2,597,475 | A * | 5/1952 | Grise | 210/238 |
| 2,654,482 | A * | 10/1953 | James et al. | 210/356 |
| 2,864,505 | A * | 12/1958 | Kasten | 210/315 |
| 3,568,835 | A * | 3/1971 | Hansen | 210/86 |
| 4,427,542 | A * | 1/1984 | Glover | 210/121 |
| 4,456,529 | A * | 6/1984 | Shinaver | 210/306 |
| 5,342,519 | A * | 8/1994 | Friedmann et al. | 210/232 |
| 5,985,143 | A * | 11/1999 | Lin | 210/232 |
| 7,192,518 | B2 * | 3/2007 | Roesgen | 210/149 |

* cited by examiner

*Primary Examiner* — Thomas M Lithgow
(74) *Attorney, Agent, or Firm* — James Hasselbeck

(57) ABSTRACT

A fuel filter of an internal combustion engine has a filter housing with a housing base body of cast metal and at least one lid. Screws are provided for attaching the at least one lid to the housing base body. A lid seal seals the at least one lid relative to the housing base body. The housing base body has screw receptacles for the screws and a seal seat for the lid seal. The screws are self-tapping screws. The screw receptacles and the seal seat are formed by casting technology without after machining.

9 Claims, 2 Drawing Sheets

FUEL FILTER OF AN INTERNAL COMBUSTION ENGINE

CROSS REFERENCE TO RELATED APPLICATIONS

This application claims the benefit under 35 USC 119 of the filing date of Federal Republic of Germany patent application no. DE 202008010505.6 filed Aug. 7, 2008, the entire disclosure of which is incorporated herein by reference.

TECHNICAL FIELD

This disclosure relates to a fuel filter of an internal combustion engine.

BACKGROUND OF THE INVENTION

Fuel filters of internal combustion engines, in particular in the automotive field, include a filter housing with a housing base body and at least one lid. Frequently, the housing base body is comprised of cast metal, in particular die cast aluminum or the like. The mechanically less loaded lid may be comprised of plastic material and is screwed by means of screws to the housing base body. Between the lid and the housing base body a lid seal is arranged in order to make the mounted filter housing fuel-tight in operation.

According to the prior art, the cast metal blank of the housing base body is mechanically processed (machined) at least in the area of the screw receptacles for the lid screws and at the sealing seat of the lid seal. A thread is cut into the screw receptacles. The seal seat is turned to size for which purpose material allowance of approximately 1 mm is required on the cast blank. The step of chip-producing after machining of the cast blank requires cost-intensive working steps. The material allowance in the area of the surfaces to be machined increase the material costs. The finished fuel filters are subject to high requirements in particular with respect to cleanliness as a protection from foreign bodies in the fuel path. After the machining step (cutting), there is therefore an intensive rinsing process required for cleaning the machined housing base body; this represents an undesirable and significant cost factor.

It is therefore an object of the present invention to further develop a fuel filter of the aforementioned kind such that the requirements with regard to clean components can be fulfilled with simple means and high processing safety.

SUMMARY OF THE INVENTION

According to the present invention, this object is solved in that the lid screws are self-tapping screws and in that the screw receptacles as well as the seal seat are produced by casting technology without after machining (cutting).

Eliminating the after machining (cutting) step lowers the manufacturing costs. The elimination of material allowance at the seal seat and/or at the screw receptacles reduces the material costs. In particular, no chips are produced during manufacture that would constitute a soiling risk. Washing or rinsing of the cast metal housing base body is not required. While reduced manufacturing costs are provided, the strict requirements with regard to removal of residual manufacturing contaminants can be fulfilled.

In a preferred embodiment of the invention the lid seal is a radial seal. In particular, the seal seat tapers relative to the axial insertion direction of the lid seal. This takes into consideration that the seal seat that is shaped by casting technology and is not further machined has coarser manufacturing tolerances in comparison to a seal seat machined by turning. However, the conical extension in the insertion direction in combination with the radial seal still provides a reliable sealing action because upon axial insertion of the seal a circumferentially extending radial pressing action between the radial seal and the seal seat is provided. At the same time, a mold incline is provided in this way that also facilitates removal of the cast blank from the mold.

In an advantageous embodiment, the housing base body has a contact surface for the lid wherein the screw receptacle comprises an integrally formed spacer sleeve that engages a screw opening of the lid. Preferred is in this connection that the spacer sleeve extends completely through the screw opening. Without the need for an additional separate insertion sleeve the lid can be properly centered by means of the integrally formed spacer sleeve. For the completely embodied configuration, the spacer sleeve acts as an axial stop for the screwed-in lid screw. Overloading of the lid material is prevented so that the lid can be produced of comparatively soft material such as plastic material or the like.

It can be expedient to dispense with machining (cutting) only selectively in the area of the screw receptacles and/or of the seal seat. Preferably, the housing base body as a whole is produced by casting technology without chip-producing after machining. While fulfilling with the requirements with regard to residual machining contaminants, a rinsing step can be eliminated.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
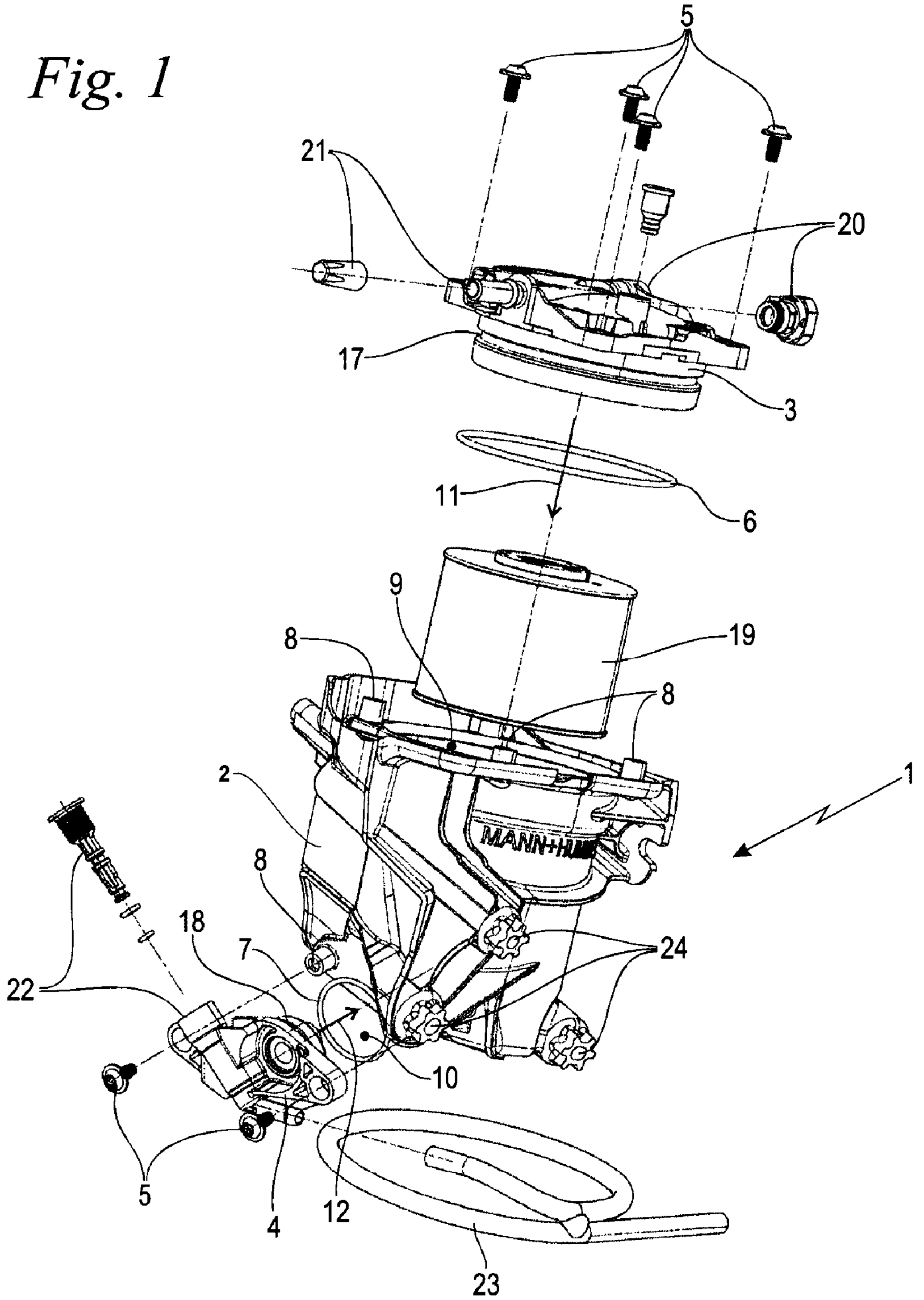
FIG. 1 shows in a perspective exploded view a fuel filter according to the invention with the housing base body produced from die cast aluminum with two lids as well as screw receptacles and seal seats that have not been mechanically machined.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a fuel filter as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows in a perspective exploded illustration a fuel filter that is embodied according to the invention for an internal combustion engine of a motor vehicle. However, other applications of the fuel filter, for example, for stationary motors or the like can be envisioned. The fuel filter comprises a filter housing 1 that is comprised of a housing base body 2 of cast metal as well as two lids 3, 4. Die cast aluminum is provided in this connection for the housing base body 2. However, other metal types or casting technologies may be expedient. The two lids 3, 4 are comprised of injection-molded plastic material.

The housing base body 2 encloses an interior chamber 40 in which a filter element 19 is inserted in axial insertion direction 11. The interior chamber 40 that receives the filter element 19 is closed off by means of lid 3. The lid 3 is provided with a fuel inlet 20 and a fuel outlet 21. The internal combustion engine, not illustrated, draws in fuel through the fuel outlet 21, the filter element 19, and the fuel inlet 20 wherein the fuel passing through the filter is filtered in the filter element 19.

The additional lid 4 is part of a drainage device for draining water and fuel from the interior chamber 40 of the filter housing 1. For this purpose, the lid 4 is provided with a drainage valve 22 and a drainage hose 23.

On the side facing the housing base body 2, both lids 3, 4 have a collar, respectively, with a circumferentially extending radial groove 17, 18. In the mounted state, a lid seal 6 in the form of an O-ring is inserted into the radial groove 17 of the lid 3 while in the radial groove 18 of the drainage device lid 4 a further lid seal 7 is inserted that is also embodied as an O-ring. It is also possible to use other seal configurations as are known to those skilled in the art.

In the connecting area of the two lids 3, 4, the housing base body 2 is provided with a seal seat 9, 10, respectively, for receiving the lid seals 6, 7. The seal seats 9, 10 are circular in cross-section and taper conically relative to the respective insertion direction 11, 12. In the mounted state of the lids 3, 4 the seal seats 9, 10 enclose the respective lid seal 6, 7 radially on their exterior side and provide radial pressure. The lids 3, 4 inserted with their seal 6, 7 into the seal seat 9, 10, respectively, are secured on the housing base body 2 by means of the lid screws 5 for which purpose the housing base body 2 is provided with integrally formed screw receptacles 8. Moreover, the housing base body 2 has further screw receptacles 24 for attachment of the filter housing 1 at the mounting location.

The housing base body 2 as a whole is produced by casting technology without chip-producing after machining. This concerns in particular the seal seats 9, 10 as well as the screw receptacles 8, 24. The cast blank of the housing base body 2 is simply removed after the casting process from the mold, deburred and rinsed. A further mechanical, in particular chip-producing machining step, is not performed. Further details for configuring the seal seats 9, 10 and the screw receptacles 8 will be disclosed in connection with FIGS. 2 and 3 in more detail.

Figure 2:
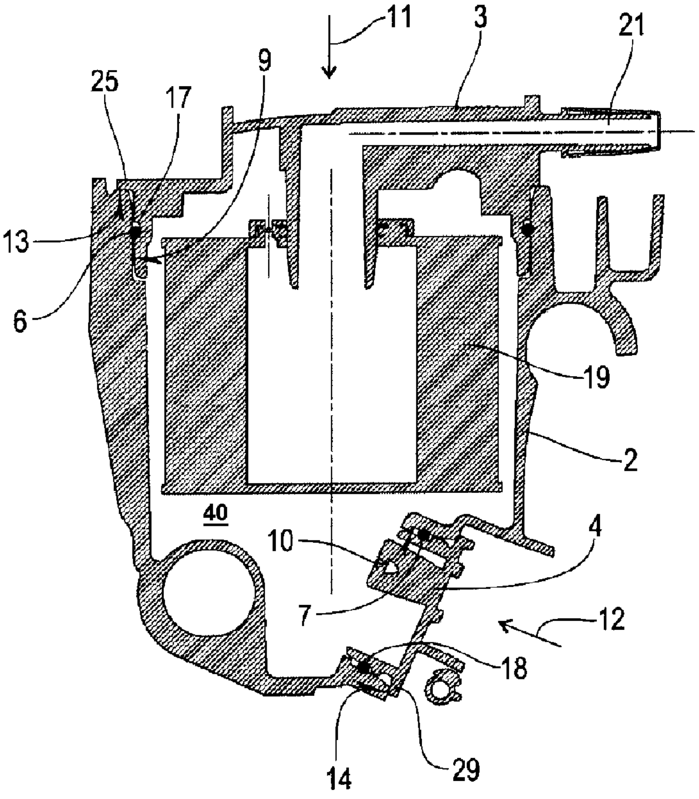
FIG. 2 shows a longitudinal section of the mounted fuel filter according to FIG. 1 with details relating to the interaction of the seal seats and the radial seals at both lids.

FIG. 2 shows in longitudinal section the mounted filter housing 1 according to FIG. 1. It can be seen that the lid 3 with integrally formed fuel outlet 21 and centrally attached filter element 19 has been inserted in the insertion direction 11 into the housing base body 2 to such an extent that a circumferentially extending flange 25 of the lid 3 rests axially against the contact surface 13 circumferentially extending about the seal seat 9. In this connection, the circumferentially extending seal seat 9 that tapers slightly conically in the insertion direction 11 encloses the lid seal 6 that is secured in the circumferentially extending radial groove 17. The same holds true also for the drainage device lid 4 inserted in the insertion direction 12 and resting with its flange 29 on a contact surface 14 of the housing base body 2; the lid seal 7 secured in the circumferentially extending radial groove is enclosed radially on its exterior by the seal seat 10 that tapers slightly conically relative to the insertion direction 12. A conical shape of the seal seats 9, 10 causes in combination with the axial insertion direction 11, 12 an increasing radial pressure between seal seat 9, 10 and lid seal 6, 7 so that manufacturing tolerances in the seal seat 9,10 produced by casting technology are compensated.

Figure 3:
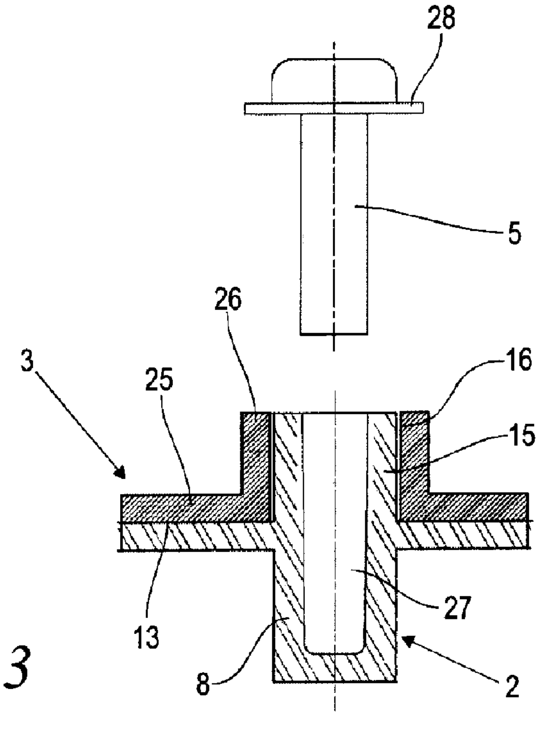
FIG. 3 shows an enlarged schematic detail illustration of the screw connection according to the invention of the lid and the housing base body.

FIG. 3 shows in a schematic detail illustration in an exemplary fashion a screw connection between the lid 3 and the housing base body 2. The same holds true also for the screw connection between the lid 4, not illustrated here, with its flange 29 and the housing base body 2 with its contact surface 14 (FIG. 2). The lid 3 is provided with circumferentially extending flange 25 that rests axially against the contact surface 13 of the housing base body 2. The screw receptacle 8 that is integrally formed on the housing base body 2 comprises a spacer sleeve 15 that is also integrally formed and that passes complete through a screw opening 16 of the lid 3 in the axial direction. In the area of the screw opening 16 a circumferentially extending collar 26 is optionally provided that projects in axial direction past the flange 25. The free end faces of the collar 26 and of the spacer sleeve 15 are flush relative to one another in the mounted state. The screw receptacle 8 is provided with a blind bore 27 opening toward the lid screw 5; the blind bore 27, relative to the outer thread diameter of the screw 5, has a reduced inner diameter. In the raw state, the blind bore 27 has smooth inner walls without a thread being provided. The entire screw receptacle 8 including the thread-free blind bore 27 is produced by casting technology without chip-producing machining. The lid screw 5 is a self-tapping screw and is screwed into the blind bore 27. The outer thread of the lid screw 5 is screwed in a self-tapping action into the blind bore 27 that is undersized. In the tightened state of the lid screw 5 the screw head 28 rests flat against the end faces of the collar 26 and the spacer sleeve 15. In this way, the flange 25 of the lid 3 is pressed against the contact surface 13. At the same time, the spacer sleeve 15 prevents excessive compression of the lid 3, injection-molded from a comparatively soft plastic material, in the area of the collar 26 or the screw opening 16.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fuel filter of an internal combustion engine, said fuel filter comprising:

a filter housing comprising a housing base body of cast metal, a plurality of cast unmachined screw receptacles formed into said housing base body, and at least one lid having a plurality of screw openings therethrough, screws received through said screw openings and mountably engaged in said screw receptacles securing said at least one lid to said housing base body, a lid seal that seals said at least one lid relative to said housing base body;

wherein said housing base body has a seal seat for said lid seal;

wherein said screws are self-tapping screws;

wherein said screw receptacles and said seal seat are formed by casting technology without after machining;

wherein said housing base body has a respective seal seat for said lid seal of said at least one lid, said seal seat extending conically in an axial insertion direction of a respective one of said at least one lid, said seal seat configured to closeably seal against said lid seal in a radial sealing direction;

wherein said lid seal is received into a circumferential radial groove disposed onto a respective one of said at least one lid;

wherein said conical tapering of said seal seat in combination with insertion of said at least one lid onto said housing base body in said insertion direction increases radial pressure between said seal seat and said lid seal, said increased seal pressure compensating for courser manufacturing tolerances of the unmachined seal seat to still achieve sealing;

wherein said screw receptacles and said seal seat are formed by casting technology without after machining.

2. The fuel filter according to claim 1, wherein said housing base body has a contact surface for said at least one lid and wherein said screw receptacles each comprise an integrally formed spacer sleeve engaging a screw opening of said at least one lid.

3. The fuel filter according to claim 2, wherein said spacer sleeve passes completely through said screw opening.

4. The fuel filter according to claim 1, wherein said housing base body as a whole is formed by casting technology without after machining.

5. The fuel filter according to claim 1, wherein said O-ring is tapered in said axial direction of insertion.

6. A fuel filter for an internal combustion engine comprising:

a filter housing comprising a housing base body defining an interior chamber configured to axially receive a filter element therein and a plurality of cast unmachined screw receptacles formed into said housing base body, said housing base including:

at least one lid at least one lid having a plurality of screw openings therethrough;

a plurality of screws configured and adapted to be received through said screw openings and mountably engage in said screw receptacles for securing said at least one lid to said housing base body; and at least one lid seal, each seal configured to seal in a radial direction respective one of said at least one lid relative to said housing base body;

wherein said housing base body includes a contact surface and each of said at least one lid includes a cooperatively configured circumferentially extending flange wherein said flange and contact surfaces are configured and adapted to closeably mate when said at least one lid is secured onto said housing base body;

wherein said housing base body has a respective seal seat for each of said at least one lid seal, said seal seat configured to closably seal against said lid seal in said radial direction, said seal seat extending conically in an insertion direction of a respective one of said at least one lid;

wherein said at least one lid seal is an O-ring received into a circumferential radial groove disposed onto said at least one lid, said O-ring tapered in said axial direction of insertion, said radial sealing of said lid seals in combination with said axial tapering of said lid seals radially sealing to said conically extending seal seat of said base body compensating for courser manufacturing tolerances of the unmachined seal seat to still achieve sealing;

wherein said screws are self-tapping screws; and wherein said screw receptacles and said seal seat are formed by casting technology without after machining.

7. The fuel filter according to claim 6, wherein said screw receptacles each further comprise an integrally formed axially extending spacer sleeve sized and adapted to be received into and extend into a respective one of said screw openings of said at least one lid; and wherein said spacer sleeve extends sufficiently in said screw opening to prevent excessive compression of said at least one lid when said lid is secured by said screws to said housing base body.

8. The fuel filter according to claim 7, wherein said housing base body comprises die cast aluminum and said at least one lid comprises molded plastic.

9. The fuel filter according to claim 8, wherein said housing base body as a whole is formed by casting technology without after machining.

* * * * *